Dec. 17, 1935.  A. M. CAMPBELL  2,024,625
FIRE CONTROL DEVICE
Filed June 2, 1932   2 Sheets-Sheet 1

Acheson Meacham Campbell
INVENTOR.

Dec. 17, 1935.　　　A. M. CAMPBELL　　　2,024,625
FIRE CONTROL DEVICE
Filed June 2, 1932　　　2 Sheets-Sheet 2
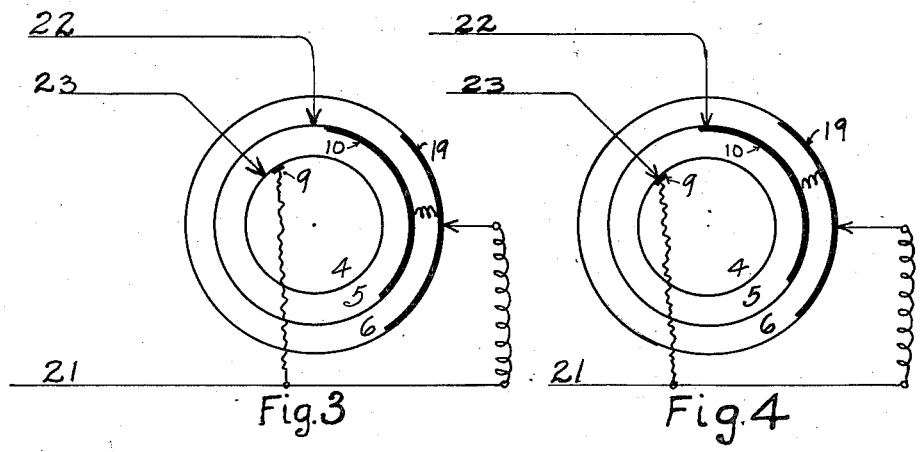
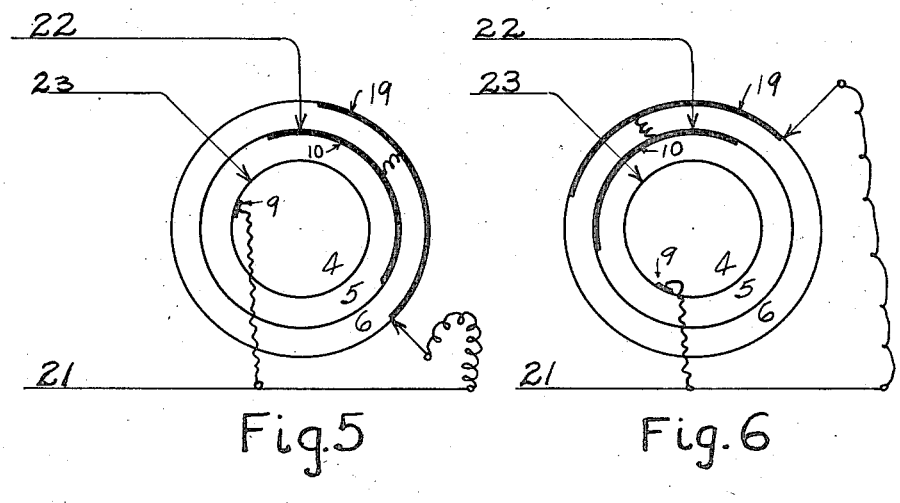

Patented Dec. 17, 1935

2,024,625

UNITED STATES PATENT OFFICE 2,024,625

FIRE CONTROL DEVICE

Acheson Meacham Campbell, Glendale, Ohio

Application June 2, 1932, Serial No. 615,019

6 Claims. (Cl. 236—91)

The invention relates to electric controls for fires. The objects of the improvements are to control fires so that the places heated shall be kept within desirable limits of temperature, that danger, and injury due to overheating will be avoided, and that in case a small fire, commonly known as a pilot fire, goes out, the fire producing mechanism cannot start until the fire is manually lighted.

Figure 2:
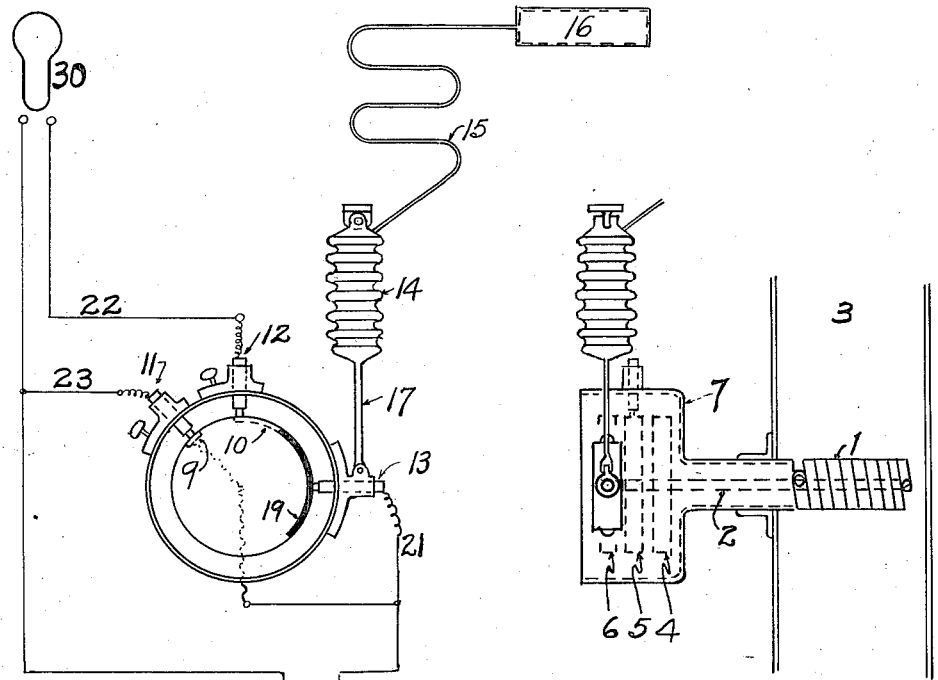
Figure 1:
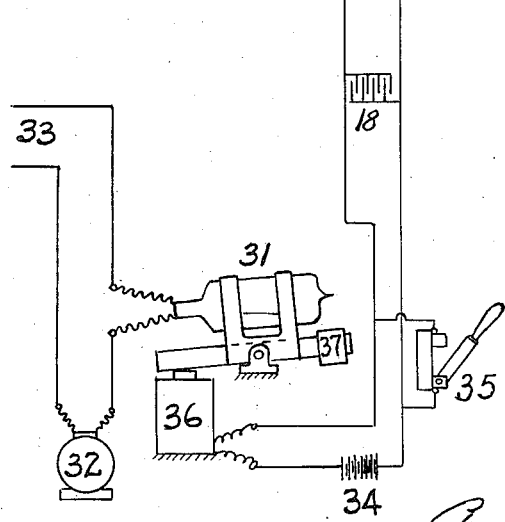

Fig. 1 is a diagrammatical view of the device of the invention. Fig. 2 is a detail view, in elevation, showing a regulator and associated mechanism disclosed in Fig. 1. Figs. 3, 4, 5, and 6 are diagrammatical views showing the electrical circuit control means (4, 5, 6) of Fig. 2 in various positions corresponding to various temperature conditions.

One form of the device is shown on the accompanying drawings. It may be used in connection with an instrument 30, commonly known as a thermostat which closes an electric circuit below a certain temperature, and opens it above a certain temperature; also in connection with some form of electric switch shown at 31, which in turn controls the burner 32. Power is supplied to the burner through electric power lines 33; electric current for operating the device is supplied by a source 34. Number 35 is a manually operated switch, for starting the system. Number 36 is an electromagnet which when magnetized by the controlling current, closes the switch 31, and starts the burner. Number 37 is a counterweight to open 31 when the electric control circuit is opened.

The improvements have to do with subsidiary controls, now to be explained, in combination with the above mentioned things. If the fire or pilot fire goes completely out for any reason, it is desirable to completely stop the burner, until it receives manual attention. This is the first object of the new device. With some kinds of burners a small fire is desirable, regardless of chamber temperature, as for instance, a stoker-fired coal burner. This is provided for by circuit 23 in the new device, and this is the second object of this new device. The extent to which the fire should be built up when the chamber thermostat calls for heat depends on the temperature outside the chamber. For instance, in a home, the extent to which the fire should be built up depends on the outside temperature. The third object of the new device is to accomplish this. The action of the thermostat often lags too much, and a fire is built up so that the furnace temperature goes dangerously high. To prevent this occurrence is the fourth object of the new device.

In the drawings, Fig. 1 is a general drawing of the device. Fig. 2 is a fragmentary side view. Number 1 is a heat sensitive spring, which rotates the shaft 2, as the heat about the spring varies. 3 is a space filled with liquid or gas the temperature of which varies relatively quickly with the fire. 4, 5, and 6 are discs of insulating material, into the periphery of which are set electrical conducting strips 9, 10, and 19. 9 is flexibly electrically connected as shown by wavy dotted line. Numbers 10 and 19 are electrically connected. Number 7 is a supporting case. Bearing on the periphery of the discs, with light spring tension, are electrical brushes or rollers 11, 12, and 13. These are in turn mounted in brackets which fasten to case 7. Numbers 11 and 12 are manually adjustable on the periphery of the case with a locking device to keep them in place when once set. Number 13 is slidably mounted on the periphery of the case and its position changed with changing temperatures of 16. Number 16 is a chamber containing a fluid placed in any suitable location, for instance, for building heating, placed outside the building. As the temperature rises about 16 the fluid expands flowing through the pipe 15 and into the chamber 14. When the temperature falls the opposite happens. This causes the rod 17 connected to 14 to move downward or upward carrying the electrical contact 13 lower or higher. 14 may be a bellows or cylinder or any container which on changing volume moves 13. Number 18 is an electrical condenser connected, as indicated, to minimize sparking.

Reference will now be made to drawings, Sheet #2, in which are shown figures of the electrical circuits used in the device. For the sake of clarity the discs are shown superimposed, and of different diameters. Arrows indicate the contact brushes or rollers. Figure 3 shows the position of the discs when the fire is very low and temperature at part 16 medium, as shown by position of arrow for circuit 21. In this position the control circuits are open and the burner turned off. The fire will have to be manually started. This fulfills the first object of the invention mentioned above. Figure 4 shows the position of the discs when the fire is at a low temperature, the magnet 36 energized and the burner on. The thermostat may or may not be on closed circuit. This fulfills the second object of the invention. Figure 5 shows the position of the discs, with medium low temperature in space 3 and the burner about to be stopped because of high outside temperature, at part 16, as indicated by arrow for circuit 21. Figure 6 shows the position of the discs when the fire is at maximum heat and about to be turned off to prevent dangerous overheating. This indicates how the fourth object of the invention is fulfilled. The outside temperature is very low as indicated by the position of the arrow contact for circuit 21.

Having described the mechanism and the electrical circuits the operation will now be described.

To start a fire, switch 35 is closed. This energizes magnet 36, closing switch 31 and starting the burner. A fire is kindled. The temperature in space 3 rises quickly to a point such that the discs revolve until circuit 23 is closed. The switch 35 is then opened and the operation becomes automatic, circuit 23 energized, unless for some reason the fire goes out. The temperature in space 3 rises until disc 4 rotates its conductive periphery 9 past contact on circuit 23. If the thermostat is on closed circuit, the electricity flows from its source thru the thermostat contact, through circuits 22 and 21, energizing the magnet 36 and keeping the burner going. The temperature in space 3 will normally continue to rise until disc 6 rotates to the positions shown in Figures 5 and 6, at which time the burner is shut off. The burner will go on and off as the temperature in space 3 falls and rises, breaking and making the contact on circuit 21 until such time as the thermostat receives enough heat and opens the circuit. The thermostat will now normally take control of the burner, starting and stopping it as it opens or closes its circuit. Due to circuit 23 it cannot, however, keep the burner off long enough to entirely put out the fire, and due to circuit 21 it can only run the burner long enough to build a fire which is suitable for temperatures outside the space heated.

In the claims the word "device" will signify the "fire control device" for which letters patent are sought. The word "burner" will signify "any form of fire producing mechanism". The word "thermostat" will signify "any device making or breaking an electric circuit on a rise or fall of temperature past the points for which it is set". The word "regulator" will signify "any form of heat sensitive device which will move an electrical contact when its proper part is subject to temperature change."

What I claim is:—

1. A device for controlling a burner with means to automatically stop the burner when the fire is too low to rekindle, in combination with a thermostat in the spaces heated, in combination with a regulator to vary the amount of fire which the burner may produce according to temperatures at the heat sensitive part of the regulator.

2. A burner controlling device, comprising three rotatably moveable electrical contacts connected to a heat sensitive element, subject to the changing temperatures of the controlled fire, a supporting case, two electrical contacts manually adjustable on the case, making contact with two of the moveable contacts, a slidably adjustable electrical contact, whose position is controlled by a regulator, normally subject to outside temperatures, making contact with the third rotatably moveable contact, in combination with a source of electrical energy, and a means for starting and stopping the burner from this control energy.

3. A temperature controlling system for buildings comprising in combination, a burner and electricity operated means for intermittently feeding fuel to the burner, conduit means for conveying hot gases of combustion from the burner, an electrical circuit and switches in said circuit, means controlling the switches for energizing and de-energizing the electrically operated fuel feeding means in accordance with temperature differentials in the hot gas conveying conduit and the air outside the building.

4. A temperature controlling system for buildings comprising in combination, a burner and electricity operated means for intermittently feeding fuel to the burner, conduit means for conveying hot gases of combustion from the burner, an electrical circuit and switches in said circuit, means controlling the switches for energizing and de-energizing the electrically operated fuel feeding means in accordance with temperature differentials in the hot gas conveying conduit and the air outside the building, and thermostatically controlled switch means within the building for precluding closing of the aforesaid circuit and consequently the energization of the electrically operated fuel feeding means in the event of excessive heat within the building under normal burner operation.

5. A temperature controlling system for buildings comprising in combination, a burner and electricity operated means for intermittently feeding fuel to the burner, an electrical circuit, a device included in said circuit and responsive to the temperature within the building to be heated, for operating the fuel feeding means when the temperature within the building falls below a predetermined minimum, a circuit closing means under the control of the hot gases from the burner and cooperating with said interior temperature responsive device for controlling the operation of the fuel feeding means, and a device responsive to changes of temperature outside the building for modifying the time of operation of the circuit closing means irrespective of the temperature within the building.

6. A temperature controlling system for buildings comprising in combination, a burner and electricity operated means for intermittently feeding fuel to the burner, an electrical circuit including said fuel feeding means, a switch within the building and included in said circuit, for closing the electrical circuit of the fuel feeding means when the temperature within the building falls below a predetermined minimum, and two separate means one of which means is responsive to outside temperature and the other of which is responsive to the temperature of the gases of combustion given off by the burner, coacting to open the electrical circuit closed by the interior thermostatic switch in the event of excessive high temperature of the gases of combustion the outside temperature responsive means being arranged to modify the action of the combustion gas temperature responsive means in closing the electrical circuit of the fuel feeding means.

ACHESON MEACHAM CAMPBELL.